United States Patent [19]

Marchant et al.

[11] Patent Number: 5,461,598
[45] Date of Patent: Oct. 24, 1995

[54] BALANCED FOCUS ACTUATOR FOR AN OPTICAL STORAGE SYSTEM

[75] Inventors: Alan B. Marchant, Fairport; Joseph J. Miceli, Jr., Macedon, both of N.Y.

[73] Assignee: Eastman Kodak Company, Rochester, N.Y.

[21] Appl. No.: 311,849

[22] Filed: Sep. 23, 1994

Related U.S. Application Data

[63] Continuation of Ser. No. 946,681, Sep. 18, 1992, abandoned.
[51] Int. Cl.$^6$ .................................................. G11B 7/135
[52] U.S. Cl. ........................... 369/44.16; 369/44.14; 359/824
[58] Field of Search ......... 250/201.5; 369/44.14–44.16; 359/813, 814, 823, 824

[56] References Cited

U.S. PATENT DOCUMENTS

| | | | |
|---|---|---|---|
| 4,403,316 | 9/1983 | van de Veerdonk | 369/44 |
| 4,516,231 | 5/1985 | Michaelis | 369/44 |
| 4,766,583 | 8/1988 | Oinoue et al. | 250/201.5 X |
| 4,796,245 | 1/1989 | van Alem et al. | 369/44 |
| 4,813,033 | 3/1989 | Baasch | 369/45 |
| 5,111,339 | 5/1992 | Hagiwara | 369/44.11 X |

FOREIGN PATENT DOCUMENTS

| | | | |
|---|---|---|---|
| 58-211329 | 12/1983 | Japan | 369/44.14 |
| 61-182642 | 8/1986 | Japan | 369/44.16 |

OTHER PUBLICATIONS

English Translation of Japanese Kokai Patent Publication No. 58-211329, published Dec. 8, 1993 to Yuji Ikeda.
David Macaulay, "The Way Things Work", 1988, pp. 22–33, 35, 61, and 358.

*Primary Examiner*—Aristotelis Psitos
*Assistant Examiner*—Duncan Wilkinson
*Attorney, Agent, or Firm*—Raymond L. Owens

[57] ABSTRACT

In a fine-focus actuator, the lens is coupled to a base by extension members. The extension members are rotatably coupled to the base and extend beyond the base. A counter-weight, positioned on the extension members, provides, in the presence of an external inertial force, a torque balancing the torque imposed on the lens holder by the external force. The counter-weight can include elements of the actuator such as magnets, etc.

17 Claims, 2 Drawing Sheets

BALANCED FOCUS ACTUATOR FOR AN OPTICAL STORAGE SYSTEM

This is a Continuation of U.S. application Ser. No. 946,681, filed 18 Sep. 1992, which is now abandoned.

BACKGROUND OF THE INVENTION

1. Field of Invention

This invention relates generally to information storage systems which rely on the optical properties of a medium for controllable storage of information and, more particularly, to the actuator which directs a radiation beam toward, and/or detects a radiation beam which has interacted with, the storage medium.

2. Description of the Prior Art

Optical storage systems, especially those systems in which the information is stored on an optical disk-type medium, typically have read/write heads or actuators which provide the mechanism by which the radiation is applied to and received from the storage medium. The radiation beam interacts with localized regions of the information storage medium and, as a result of that interaction, the properties of the radiation beam transmitted through the optically encoded medium or reflected from the optically encoded medium are altered. By proper processing, the information stored on the medium can be recovered from the resulting radiation beam.

As higher densities of stored information in the storage media have been achieved, the requirements on the radiation beam have become more stringent. The higher densities of information on the media require that both the tracking of the applied radiation beam (to follow a path having sequential information patterns) and the focus of the applied radiation beam (on the individual information regions) be controlled within narrow limits to maximize the signal to noise ratio. By way of specific example, a portion of the radiation beam which has interacted with the storage medium can be tested by using radiation detector(s) with appropriate optical stops to determine whether radiation beam meets certain shape and size constraints. When the dimensional constraints are violated, the radiation beam is considered out of focus and the signals from the radiation detectors are used to control position apparatus. The positioning apparatus adjusts the position of an objective lens used in focussing the applied radiation. The positioning adjustment results in the focussing of the radiation on the optical storage medium. As will be clear, an externally applied force or acceleration of the storage system can result in a change of the position of the objective lens relative to the storage medium, i.e., because of the inertial force acting on the mass associated with the objective lens. The change in position results in the loss of information until the feedback loop associated with the focussing control can reestablish the appropriate position of the objective lens relative to the storage medium. Heretofore, the applications of the optical storage systems have been selected such that external forces and accelerations are small or infrequent during operation of the optical information storage system. However, applications have been proposed for the optical information storage systems which can involve the possibility of unpredictable external forces and accelerations.

In the past, attempts have been made to minimize the impact of selected external forces and accelerations on the actuator associated with an optical storage system. U.S. Pat. No. 4,796,245, issued Jan. 3, 1989 in the name of van Alem et al, discloses an example of a two-axis rotary actuator. The mass distribution of the lens holder is balanced so that lateral accelerations will not disturb the tracking orientation. No attempt is made in the reference to protect the (vertical) focus motion from disturbances. U.S. Pat. No. 4,403,316, issued Sep. 6, 1983 in the name of van de Veerdonk, is similar to the van Alem reference, but is applied to a rotary radial-access device rather than a fine-tracking/focus actuator. U.S. Pat. No. 4,516,231, issued on May 7, 1985 in the name of Michaelis, provides a technique for balancing motions induced by motor forces. Vibration and reaction forces from the motor are attenuated before interacting with the drive mechanism. External perturbations to the system are not addressed by this reference. U.S. Pat. No. 4,813,033, issued on Mar. 14, 1989 in the name of Baasch et al, describes an actuator in which the motor forces are applied around the center mass of the moving part. However, the mass distribution of the moving part is asymmetrical in both the tracking and the focussing directions resulting in an adverse reaction to external forces.

The related art references do not address the problem of protecting the focussing apparatus against external forces and accelerations which would break the 'lock' of the focus control feedback loop. High density storage systems for more dynamic applications require an actuator that is less susceptible to external disturbances.

It is therefore an object of the invention to provide an improved actuator for a optical information storage system.

It is a feature of the invention to reduce the sensitivity of an actuator of an optical storage system to impact and acceleration.

It is a more particular feature of the present invention to reduce the sensitivity of the focus control of an actuator for an optical storage system to impact and acceleration.

It is another particular feature of the present invention to provide a counter-weight to an actuator arm to compensate for impact and acceleration on the focus control of an actuator arm.

SUMMARY OF THE INVENTION

The present invention is directed to overcoming one or more of the problems set forth above. Briefly summarized, according to one aspect of the present invention, a base element is coupled to the optical information storage system about which an optical element that controls the focussing of radiation on the storage medium can pivot. According to one embodiment, an objective lens is held by a lens holder. The lens holder is coupled to one end of an extension means, the extension means controllably pivoting about the base element. On the second end of the extension means, the second end being positioned on the opposite side of the base element relative to the lens holder, a counter-weight is coupled in such a manner to provide a compensating torque for an acceleration of the lens holder resulting from interaction with the external environment. The extension means can be, for example, a plurality of pivot arms or a plurality of flexure members. The extension means is structured to maitain the tilt orientation of the lens holder during a pivoting operation. According to one aspect of the invention, the lens holder can include additional optical components such as the radiation beam source.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENTS

1. Detailed Description of the Figures

Figure 1:
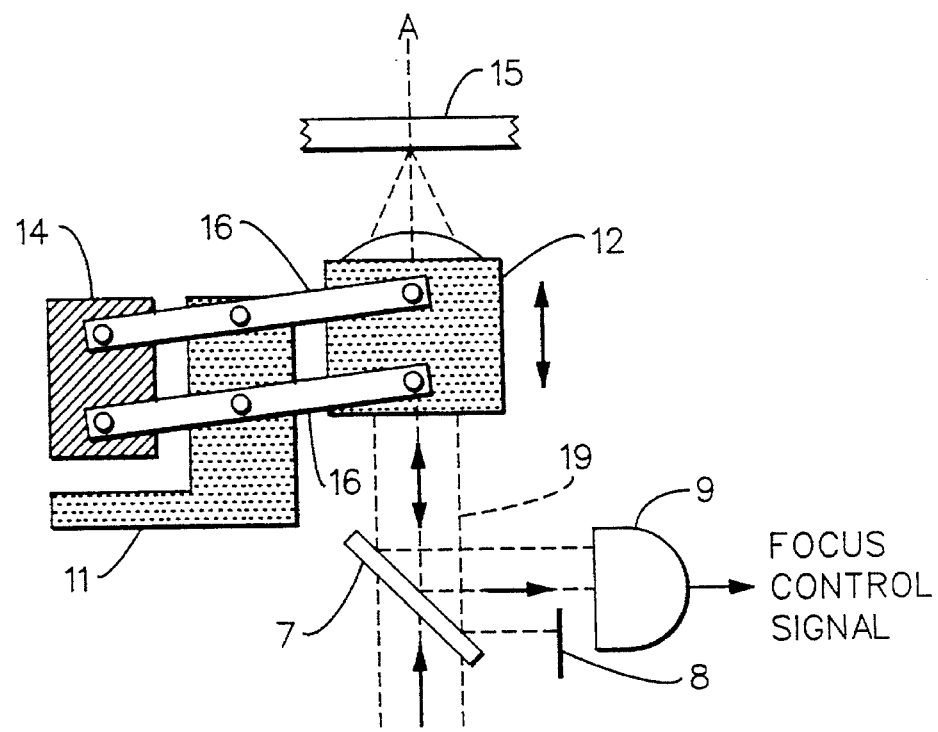
FIG. 1 is a side view of a focus control actuator having compensation for external forces.

Referring now to FIG. 1, the general configuration of a focus control actuator, according to the present invention, is shown. A lens holder 12 and the associated objective lens focus a radiation beam 19 on the recording layer of a storage medium 15. Typically, the storage medium 15 will be in the form of a rotating disk. Linkage arms 16 are coupled to a base 11, the base 11 being coupled to the remainder of the optical information storage system. The linkage arms 16 extend beyond the base 11 and engage counter-weight 14. The (4) linkage arms 16 are coupled to the base 11 by pivot points in such a manner as to maintain the lens holder 12 and objective lens in a constant orientation with respect to the base 11. In addition, when the linkage arms are perpendicular to the vertical orientation, for small angular excursions, the optic axis A of the objective lens will not be appreciably changed.

In FIG. 1, another aspect of the actuator is illustrated. Mirror 7 can direct a portion of the radiation beam which has interacted with the optical storage medium to radiation beam detector 9. The path of the radiation beam can include optical stops (8) so that the intensity of radiation detected by the radiation detector 9 can be associated with geometric parameter, i.e., the area of an illuminated region, and be related to the focus of the applied radiation beam. The output signal of radiation detector 9 can therefore be a focus control signal. The focus control signal can be used to control the position of the lens holder 12 relative to storage medium 15 by a positioning means, not shown.

Figure 2:
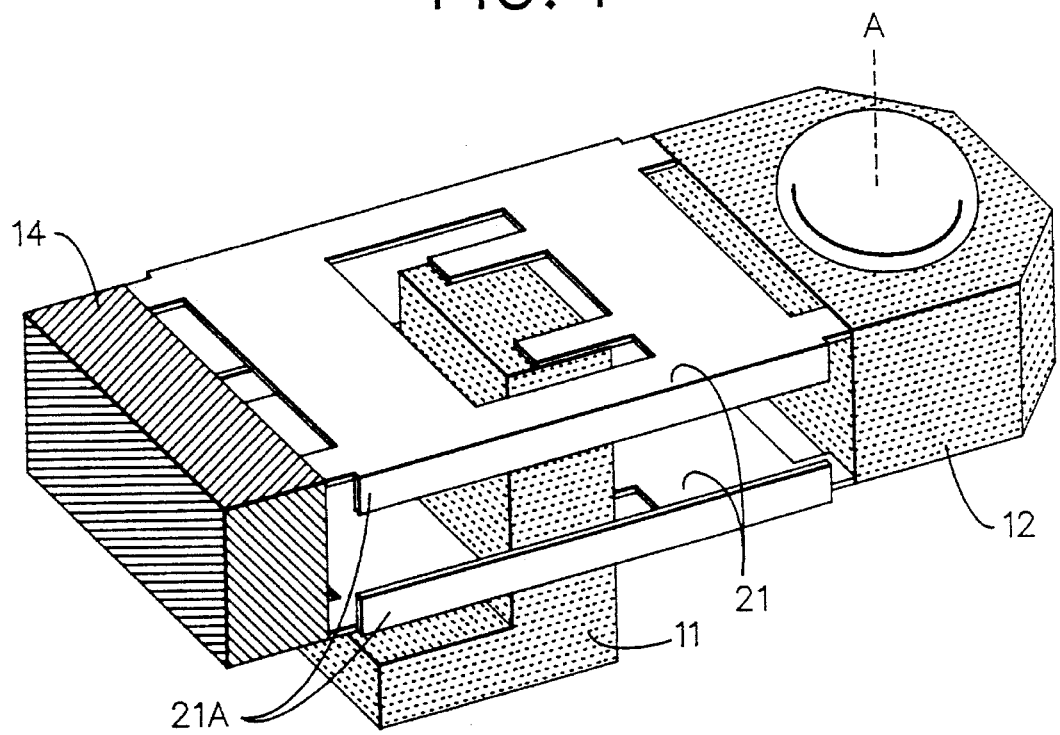
FIG. 2 is a perspective view of a second embodiment of a focus control actuator having compensation for external forces.

Referring to FIG. 2, a focusing control actuator is shown that does not require the use of a pivoting extension means for coupling the lens holder 12, along with the objective lens, and the counter-weight 14 to the base 11. In the implementation shown in FIG. 2, the lens holder 12 and the counter-weight 14 are coupled by two flexure plates 21. The flexure plates 21 are stiffened, i.e., by bending edge portions 21A, to couple the motion of the lens holder 12 and the counter-weight 14. In the illustrated implementation, the flexion is confined to the regions in the vicinity of the lens holder 12 and the counter-weight 14. However, flexure plates can have a different geometries without departing from the invention.

Figure 3:
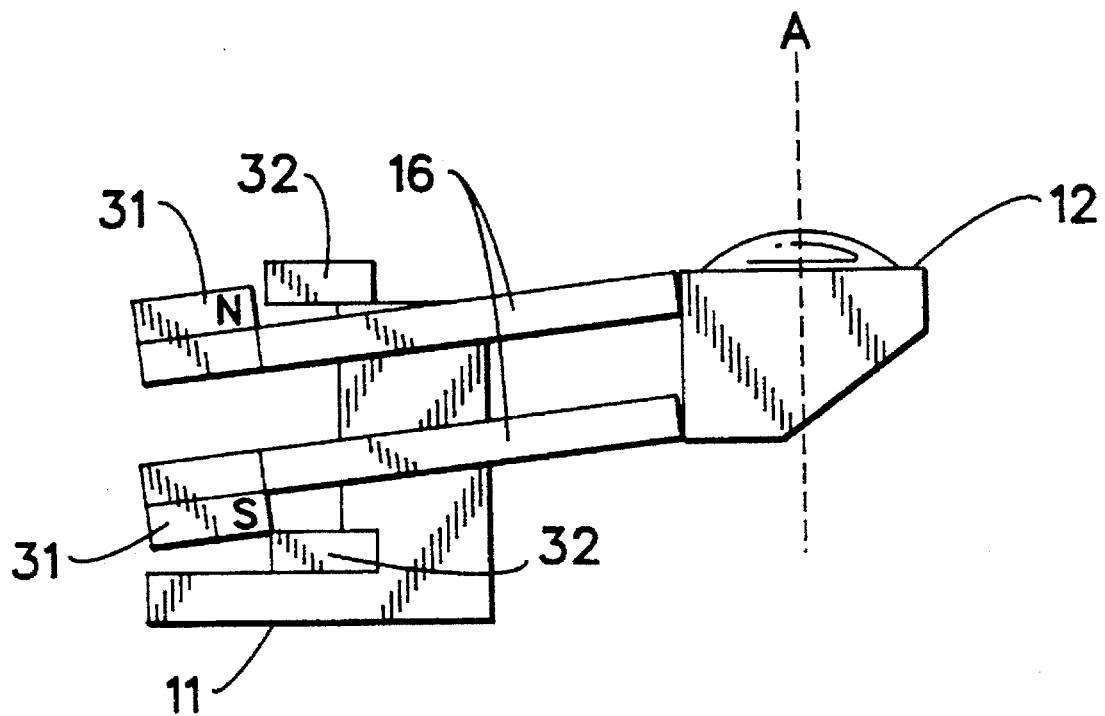
FIG. 3 is a side view of a focus control actuator having compensation against external forces and illustrating a mechanism for driving the focus control actuator.

In FIG. 1 and FIG. 2, the motor used to position the lens holder has not been illustrated. An example of a motor is illustrated in FIG. 3. In FIG. 3, the counter-weights 31 can include a permanent magnet or magnets. On the base 11, a coil 32 is positioned, the field produced by a current through the coil interacting with the permanent magnets and determining the position of the magnets relative to the coil 32. This type of motor, which includes part of the focus actuator (i.e., the counter-weights), can be very compact and efficient.

2. Operation of the Preferred Embodiment

It will be now appreciated that there has been presented a technique and associated apparatus for compensating for external forces which could otherwise result in compromise of the operation of the focus control actuator. A counter-weight is coupled to the focus control actuator in such a manner that the torque resulting from an external force being applied to the focus control actuator will be compensated by the torque generated by the inertia of a counter-weight on an opposite side of a base element. The focus control actuator and the counter-weight(s) are coupled to the base element in such a manner as to compensate for torque resulting from acceleration of the focus control actuator and the counter-weight, i.e., the acceleration caused by externally derived forces. In order to balance the torques in the presence of an acceleration, the mass of the counter-weight times the distance between the counter-weight and the base element must equal the mass of the focus control actuator times the distance between the focus control actuator and the base element.

The extension members to which the counter-weight and the lens holder are secured are coupled to the lens holder in such a manner that the spatial orientation of the lens holder remains constant even when the extension members are pivoted. For small excursions from a horizontal orientation (as shown in FIGS. 1–3) by the extension arms, the optic axis A of the objective lens will exhibit only minor lateral movement even when the vertical movement for a given departure from the horizontal orientation is large.

Operation of the present invention is believed to be apparent from the foregoing description and drawings, but a few words will be added for emphasis. A counter-weight used in conjunction with the holder for the objective lens and/or other optical components are coupled to the optical system in such a manner that inertial forces on the holder in a direction tending to break the radiation beam focussing lock, are compensated by inertial forces on the counter-weight.

While the invention has been described with reference to the actuator head of an optical storage system, it is apparent that the invention is easily adapted to other devices that have a feedback control system for positioning an element at a predetermined distance relative to a moving surface and that are subject to possible forces tending to break the feedback loop. Furthermore, the invention has been described as being related to an actuator head that includes a lens holder. It will be clear that the actuator can include additional or even all of the optical components, both for applying the radiation to the medium and/or for detecting the radiation that has interacted with the medium. In certain instances, even signal processing apparatus can be integrated advantageously on the lens holder. It will also be clear that in the disclosed embodiments, the counter-weight does not interfere with the lens holder, permitting the lens holder to be positioned proximate an obstruction, such as a spindle.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A focus control actuator compensated against the effects of external forces, said focus control actuator being coupled to an optical information storage system by means of a base component, said focus control actuator comprising:

a lens holder including a lens;

a counter-weight; and an extension unit pivotally coupled to said base component, wherein said lens holder is coupled to a first end of said extension unit and said counter-weight is coupled to a second end of said extension unit, said extension unit including a first extension arm and a second extension arm, said first and said second extension arms remaining in a mutually parallel configuration when said extension unit is pivoted about said base component, said extension unit maintaining said lens holder in a fixed spatial orientation to provide focus stabilization when said extension unit is pivoted about said base component such that said lens holder moves in a first direction along an optical axis of said lens and said counter-weight moves in a second direction opposite said first direction.

2. The focus control actuator of claim 1 wherein a ratio of a distance between said base component and said lens holder and a distance between said base component and said counter-weight is proportional to a ratio between a mass of said counter-weight and a mass of said lens holder.

3. The focus control actuator of claim 1 wherein said first and second extension arms are flexure elements.

4. The focus control actuator of claim 1 wherein said lens holder includes an objective lens, a radiation source, and a radiation detector.

5. The focus control actuator of claim 1 further comprising a motor for controlling a position of said lens holder relative to said base unit, wherein said counter-weights form a part of said motor.

6. A method for reducing the effect of external forces on a focus control actuator of an optical information storage system, said method comprising the steps of:

pivotally coupling an extension unit to a base element of said optical information storage system, said extension unit including a first extension arm and a second extension arm, said first and said second extension arms remaining mutually parallel when said extension unit is pivoted about said base element;

mounting a lens holder on a first end of said extension unit, said lens holder having a constant spatial orientation when said extension unit is pivoted about said base element, said lens holder positioned above a storage medium of said optical information storage medium; and mounting a counter-weight on said second end of said extension unit to provide a compensating torque to counter movement of the lens holder along an optical axis of a lens contained therein;

wherein said extension unit maintains said lens holder in a fixed spatial orientation to provide focus stabilization when said extension unit is pivoted about said base component such that said lens holder moves in a first direction along an optical axis of said lens and said counter-weight moves in a second direction opposite said first direction.

7. The method of claim 6 further including the step of positioning said counter-weight and said lens holder relative to said base element such that a distance of said counter-weight from said base element multiplied by a mass of said counter weight is approximately equal to a distance of said lens holder from said base element multiplied by a mass of said lens holder.

8. The method of claim 7 further including the step of incorporating a radiation source and a radiation detector along with an objective lens in said lens holder.

9. The method of claim 6 further comprising the step of controlling an orientation of said extension unit by a motor, said counter weights forming a part of said motor.

10. In an optical information storage system having a spindle moving an information storage medium with respect to a radiation beam, an actuator responsive to electrical signals for focusing said radiation beam on said storage media, said optical information storage system having a predetermined relationship with said spindle, said optical information storage system including a detection means for determining an optical parameter identifying a focus of impinging radiation applied to said storage medium by an optical component coupled to said actuator, said optical information system including positioning means coupled to said actuator and responsive to said detection means for positioning said actuator to maintain a focus of said applied radiation, said actuator characterized by:

a base unit having a predetermined position relative to said moving magnetic medium;

a holder unit having said optical component coupled thereto;

extension unit pivotally coupled to said base unit and having said holder unit coupled to a first end of said extension unit, said extension unit including a first extension arms and a second extension arm, said first and said second extension arm remaining mutually parallel when said extension unit is pivoted about said base unit, said extension unit maintaining a spatial orientation of said holder unit during pivoting of said extension means; and a counter-weight coupled to a second end of said extension means;

wherein the counter-weight provides a compensating torque to counter movement of the holder unit in a first direction along an optical axis of the optical component by moving in a second direction that is opposite to the first direction when the extension unit pivots about said base unit.

11. The actuator of claim 10 wherein a distance of said counter-weight from said base unit multiplied by a mass of said counter-weight is approximately equal to a distance of said holder from said base unit multiplied by a mass of said holder.

12. The actuator of claim 10 further characterized by using an objective lens as said optical component.

13. The actuator of claim 10 further characterized by implementing said first and second extension arms with flexure members.

14. The actuator of claim 10 further characterized by including at least one permanent magnet as a part of said counter-weight, said positioning means including a coil for generating a field interacting with said permanent magnet when a current determined by said detection means flows through said coil.

15. The actuator of claim 10 further characterized by a motor for controlling a position of said holder unit relative to said base unit, said counter-weight being part of said motor.

16. The actuator of claim 10 further characterized by coupling a radiation source to said holder unit.

17. The actuator of claim 16 further characterized by coupling at least part of said detection means to said holder unit.

* * * * *